July 17, 1928.
T. N. BURGHART
NONREMOVABLE NUT
Filed Dec. 21, 1925
1,677,269
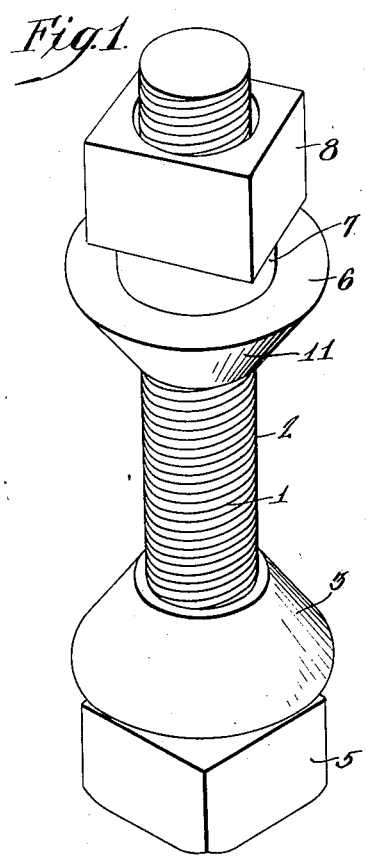
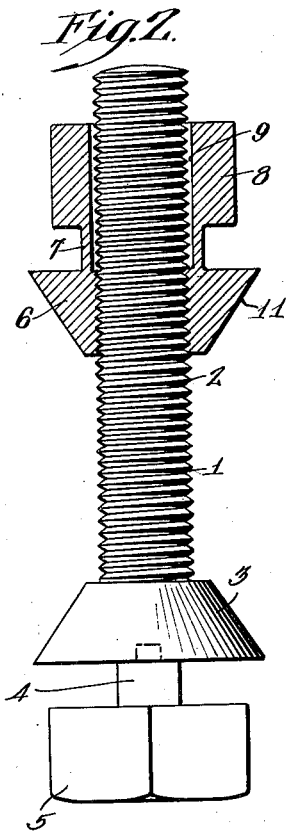
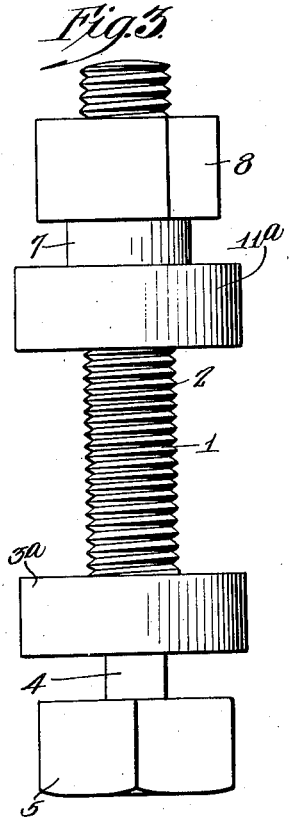
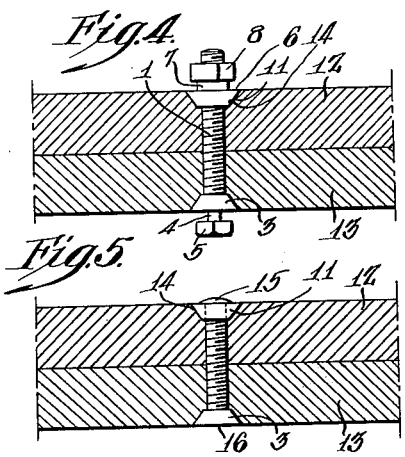
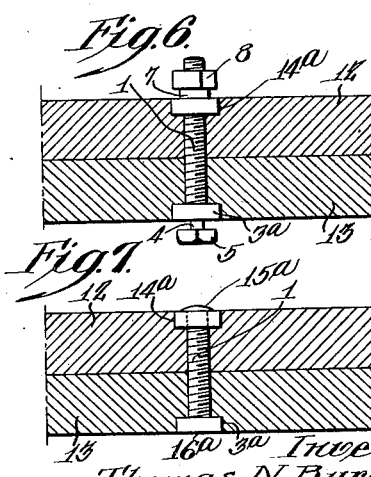
Inventor
Thomas N. Burghart
Witnesses:
Walter Chism
George A. Gruss
by Joshua R. H. Potts
Attorney.

Patented July 17, 1928.

1,677,269

UNITED STATES PATENT OFFICE.

THOMAS N. BURGHART, OF PHILADELPHIA, PENNSYLVANIA.

NONREMOVABLE NUT.

Application filed December 21, 1925. Serial No. 76,621.

My invention relates to non-removable nuts and more particularly to the type used for permanently fastening parts to prevent disconnection thereof by unauthorized persons.

The objects are to provide a simple screw fastening with which the parts may be quickly and permanently fastened in position, in close and cramped places, and which is practically impossible to remove to effect a disconnection of the fastened parts.

These objects, and other advantageous ends which will be described hereinafter, I attain in the following manner, reference being had to the accompanying drawings in which Figure 1 is a perspective view of a screw fastening embodying my invention, Figure 2 a side elevation of the fastening shown in Figure 1 drawn on a smaller scale with the nut shown in section, Figure 3 a view similar to Figure 2 of a modified form with the nut shown in full, Figure 4 a central section through two parts fastened by the screw fastening shown in Figure 1, Figure 5 a similar view showing the screw fastening in a finished condition, Figure 6 a view similar to Figure 4 showing the modified form in position, and Figure 7 a view similar to Figure 5 showing the finished condition of the modified form.

Referring to the drawing, 1 indicates a bolt which consists of a shank 2, a head 3 on the shank, a reduced part 4 integral with the head and a wrench-engaging part 5 integral with the reduced part. Head 3 may be of the counter-sunk type as shown in Figure 2 or the cylindrical type shown at 3ª in Figure 3. A nut 6 is threaded to the shank and has a reduced part 7 integral therewith and surrounding the shank, and a wrench-engaging part 8 integral with the reduced part and also surrounding the shank. The parts 7 and 8 are non-threaded, their bore 9 being of large enough diameter to clear the threads of the shank. The peripheral surface 11 of nut 6 is preferably circular so that it may fit tightly within the circular opening in the part which it fastens. Nut 11 may be of either the counter-sunk type shown in Figure 2 or the cylindrical type shown in 11ª in Figure 3.

Two parts 12 and 13 when provided with counter-sunk holes 14 as shown in Figure 4 are fastened to each other by the screw fastening shown in Figure 2, and when provided with counter-bored holes 14ª as shown in Figure 6, they are fastened by the screw fastening shown in Figure 3. In either case the bolt is passed through the holes and the nut is screwed down onto the shank by hand until it binds the parts together. The bolt is then held against turning by a wrench fitting on the wrench-engaging part 5 and the nut is screwed down tightly by a wrench fitting the wrench-engaging part 8. The screwing down of the nut is continued until the resistance thereto becomes so great that the stress produced by turning the part 8 will cause it to shear off at the reduced part 7. This sheared off part 8 is then slipped off the shank and the shank, if too long, is cut off with a hack saw or otherwise, and then beaten over with a hammer as shown at 15 in Figure 5 and 15ª in Figure 7. The wrench-engaging part 5 on the head of the bolt is then twisted off at the reduced part 4, in a manner similar to that of part 8. Any burrs left by part 4, may be cut off with a chisel or otherwise to make a neat finish on the head as shown at 16 and 16ª in Figures 5 and 7.

While I have illustrated and described a preferred embodiment and claimed my invention as residing in a non-removable nut, it will be readily seen that a non-removable bolt and other modifications might be made without departing from the scope of the appended claims.

Having thus described my invention, what I claim as new and desire to secure by Letters Patent is:

1. A non-removable nut including a body part having a desired outer shape and threaded on the inside, a reduced non-threaded part integral with said body part having a bore slightly larger than the threaded part of said body part, the center of said bored portion being in line with the center of said threaded part, a wrench-engaging part integral with said reduced part, said reduced part being of comparatively slight construction and adapted to be sheared off upon the application of certain force to said wrench-engaging part.

2. A non-removable nut including a body part having a circular periphery and formed to fit a depression in a surface conforming to its outer shape, said nut being threaded to fit a bolt passing through the depression; a non-threaded reduced part integral with the body part, and a non-threaded wrench-engaging part integral with the reduced part, said reduced part being of comparatively slight construction and adapted to be sheared off upon the application of force to said wrench-engaging part.

3. A non-removable nut including a threaded frusto-conical body part adapted to fit within a countersunk surface; a non-threaded reduced part integral with the body part having an outer diameter of slightly greater size than its inner diameter, and a non-threaded wrench-engaging part integral with the reduced part, said reduced part being adapted to be sheared off upon the application of force to the wrench-engaging part.

In testimony whereof I have signed my name to this specification.

THOMAS N. BURGHART.